US010997690B2

(12) United States Patent
Schwartz et al.

(10) Patent No.: US 10,997,690 B2
(45) Date of Patent: May 4, 2021

(54) METHOD AND SYSTEM FOR END-TO-END IMAGE PROCESSING

(71) Applicant: Ramot at Tel-Aviv University Ltd., Tel-Aviv (IL)

(72) Inventors: Eliyahu Schwartz, Haifa (IL); Raja Giryes, Tel Aviv (IL); Alexander Bronstein, Haifa (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 10 days.

(21) Appl. No.: 16/251,123

(22) Filed: Jan. 18, 2019

(65) Prior Publication Data
US 2020/0234402 A1 Jul. 23, 2020

(51) Int. Cl.
*G06T 3/40* (2006.01)
*G06T 5/00* (2006.01)
*G06N 3/08* (2006.01)
*G06N 3/04* (2006.01)

(52) U.S. Cl.
CPC ......... *G06T 3/4015* (2013.01); *G06N 3/0454* (2013.01); *G06N 3/08* (2013.01); *G06T 5/002* (2013.01)

(58) Field of Classification Search
CPC ........ G06N 3/0454; G06N 3/08; G06T 5/002; G06T 3/4015
USPC ...................................................... 382/298
See application file for complete search history.

(56) References Cited

U.S. PATENT DOCUMENTS

| 2018/0293711 A1* | 10/2018 | Vogels ................... G06F 17/10 |
| 2019/0045168 A1* | 2/2019 | Chaudhuri ............. H04N 13/15 |
| 2019/0057505 A1* | 2/2019 | Pheiffer ................. G06T 7/136 |
| 2019/0108441 A1* | 4/2019 | Thibault ............... G06T 11/008 |
| 2019/0108618 A1* | 4/2019 | Hwang ................. G06T 3/4015 |
| 2019/0180143 A1* | 6/2019 | Lyu ....................... G06K 9/6271 |
| 2019/0188539 A1* | 6/2019 | Lee ....................... G06K 9/4609 |
| 2019/0199864 A1* | 6/2019 | Nakamura ......... H04N 1/00161 |
| 2019/0278994 A1* | 9/2019 | Bumpas ............. G06K 9/00671 |
| 2020/0077023 A1* | 3/2020 | Kang ................. H04N 5/23222 |
| 2020/0082259 A1* | 3/2020 | Gu ....................... G06N 3/0454 |

(Continued)

OTHER PUBLICATIONS

Bahat et al. "Non-Uniform Blind Deblurring by Reblurring", Proceedings of the 2007 IEEE Conference on Computer Vision, ICCV 2017, Venice, Italy, Oct. 22-29, 2017, p. 3286-3294, Oct. 22, 2017.

(Continued)

*Primary Examiner* — Congvan Tran

(57) ABSTRACT

A method of processing an input image comprises receiving the input image, storing the image in a memory, and accessing, by an image processor, a computer readable medium storing a trained deep learning network. A first part of the deep learning network has convolutional layers providing low-level features extracted from the input image, and convolutional layers providing a residual image. A second part of the deep learning network has convolutional layers for receiving the low-level features and extracting high-level features based on the low-level features. The method feeds the input image to the trained deep learning network, and applies a transformation to the residual image based on the extracted high-level features.

20 Claims, 11 Drawing Sheets
(10 of 11 Drawing Sheet(s) Filed in Color)

(56) References Cited

U.S. PATENT DOCUMENTS

2020/0085382 A1* 3/2020 Taerum .................. G06N 3/084
2020/0151849 A1* 5/2020 Liao .......................... G06T 5/50

OTHER PUBLICATIONS

Buades et al. "A Non-Local Algorithm for Image Denoising", Proceedings of the 2005 IEEE Computer Society Conference on Computer Vision and Pattern Recognition, CVPR '05. San Diego, CA, USA, Jun. 20-25, 2005, 2: 60-65, Jun. 20, 2005.

Chang et al. "Color Image Demosaicking Using Inter-Channel Correlation and Nonlocal Self-Similarity", Signal Processing: Image Communication, 39(Part A): 264-279, Available Online Oct. 23, 2015.

Farsiu et al. "Multiframe Demosaicing and Super-Resolution of Color Images", IEEE Transactions on Image Processing, 15(1): 141-159, Jan. 2006.

Gharbi et al. "Deep Bilateral Learning for Real-Time Image Enhancement", ACM Transactions on Graphics, 36(4): 118-1-118-12, Jul. 2017.

Gharbi et al. "Deep Joint Demosaicking and Denoising", ACM Transactions on Graphics, TOG, 35(6): 191-1-191-11, Nov. 2016.

Khashabi et al. "Joint Demosaicing and Denoising via Learned Nonparametric Random Fields", IEEE Transactions on Image Processing, 23(12): 4968-4981, Published Online Sep. 22, 2014.

Klatzer et al. "Learning Joint Demosaicing and Denoising Based on Sequential Energy Minimization", Proceedings of the 2016 IEEE International conference on Computational Photography, ICCP, Evanston, IL, USA, May 13-15, 2016, p. 1-11, May 13, 2016.

Li et al. "Emerging From Water: Underwater Image Color Correction Based on Weakly Supervised Color Transfer", IEEE Signal Processing Letters, 25(3): 323-327, Published Online Jan. 11, 2018.

Remez et al. "Deep Class-Aware Image Denoising", 2017 International Conference on Sampling Theory and Applications, SampTA, Tallin, Estonia, Jul. 3-7, 2017, p. 138-142, Jul. 3, 2017.

Zhang et al. "Learning Deep CNN Denoiser Prior for Image Restoration", Proceedings of the 2017 IEEE International Conference on Computer Vision and Pattern Recognition, CVPR, Honolulu, HI, USA, Jul. 21-26, 2017, p. 3929-3938, Jul. 21, 2017.

* cited by examiner

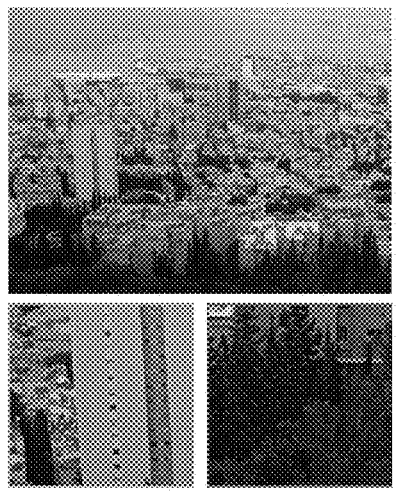
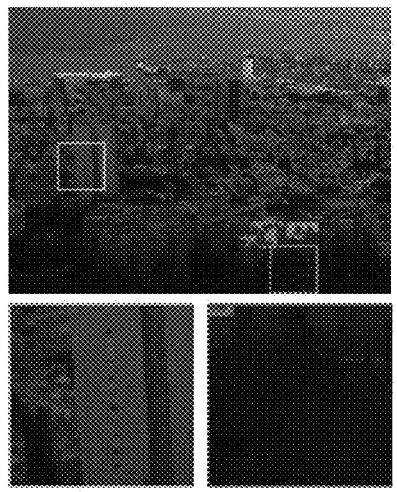
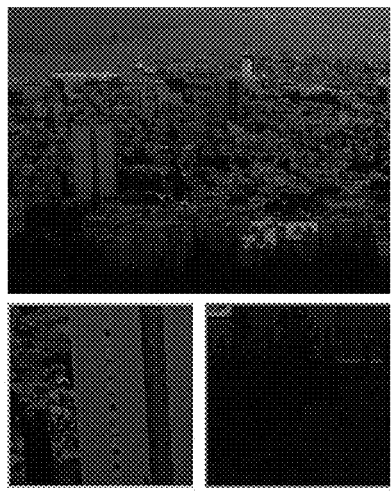
FIG. 1A                FIG. 1B                FIG. 1C
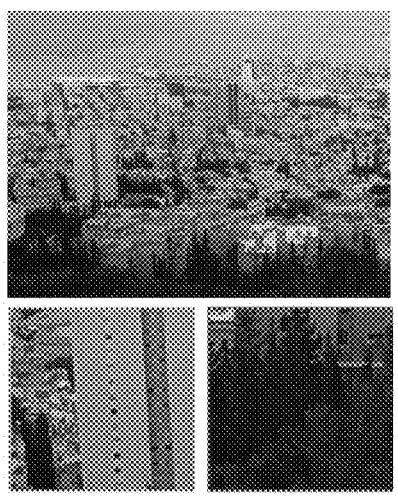
FIG. 1D                FIG. 1E

METHOD AND SYSTEM FOR END-TO-END IMAGE PROCESSING The work leading to this disclosure has received funding from the European Research Council under the European Union's Seventh Framework Programme (FP7/2007-2013) ERC grant agreement no. 335491 and grant Agreement 757497.

FIELD AND BACKGROUND OF THE INVENTION

The present invention, in some embodiments thereof, relates to image processing and, more particularly, but not exclusively, to a method and a system for end-to-end image processing.

The use of high resolution cameras in mobile phones has become increasingly popular. However, due to space constraints, their hardware is limited with respect to the pixel size and the quality of the optics. Moreover, mobile phones are usually hand-held, thus, not stable enough for long exposure times. Therefore, in these devices image signal processors (ISPs) employ various methods to compensate for these limitations.

Image signal processors perform image processing pipelines that re-sample and spatially filter (e.g., interpolate) raw image data. Such pipelines encompass a sequence of operations, ranging from low-level demosaicing, denoising and sharpening, to high-level image adjustment and color correction. Typically, each task is performed independently according to different heavily engineered algorithms per task.

SUMMARY OF THE INVENTION

According to an aspect of some embodiments of the present invention there is provided a method of processing an input image. The method comprises: receiving the input image, storing the image in a memory, and accessing, by an image processor, a computer readable medium storing a trained deep learning network. The deep learning network has a plurality of convolutional layers, wherein each of at least a portion of the layers has a first plurality of feature extraction channels, and a second plurality of channels storing residual images with correction of color values relative to a previous layer. The method comprises feeding the input image to the trained deep learning network, summing, for each of the at least the portion of the layers, a respective residual image with a residual image of the previous layer, and feeing the summation to a next layer of the trained deep learning network. The method additionally comprises generating on a display device an output showing a residual image contained in a final layer of the trained deep learning network.

According to some embodiments of the invention the trained deep learning network is trained to execute at least two low-level image processing tasks.

According to some embodiments of the invention the at least two low-level image processing tasks are denoising and demosaicing.

According to some embodiments of the invention the trained deep learning network comprises at least 15 layers.

According to some embodiments of the invention a sum of the first and the second plurality of channels is at least 32.

According to an aspect of some embodiments of the present invention there is provided a method of processing an input image. The method comprises receiving the input image, storing the image in a memory, and accessing, by an image processor, a computer readable medium storing a trained deep learning network. The deep learning network has a first part and a second part. The first part has convolutional layers providing low-level features extracted from the input image, and convolutional layers providing a residual image. The second part has convolutional layers for receiving the low-level features and extracting high-level features based on the low-level features. The method also comprises feeding the input image to the trained deep learning network, and applying a transformation to the residual image based on the extracted high-level features. The method additionally comprises generating on a display device an output showing a residual image contained in a final layer of the trained deep learning network.

According to some embodiments of the invention each of at least a portion of the layers of the first part has a first plurality of feature extraction channels, and a second plurality of channels storing residual images with correction of color values relative to a previous layer.

According to some embodiments of the invention the method comprises summing, for each of the at least the portion of the layers of the first part, a respective residual image with a residual image of the previous layer, and feeing the summation to a next layer of the first part.

According to some embodiments of the invention the low-level features comprise denoising features and demosaicing features.

According to some embodiments of the invention the input image is a raw image. According to some embodiments of the invention the input image is a demosaiced image.

According to some embodiments of the invention the method further comprises preprocessing the image by applying a bilinear interpolation, prior to the feeding.

According to some embodiments of the invention the transformation comprises a non-linear function of color components of each pixel of the residual image.

According to some embodiments of the invention the applying the transformation is executed globally to all pixels of the residual image.

According to some embodiments of the invention the first part of the trained deep learning network comprises at least 15 layers.

According to an aspect of some embodiments of the present invention there is provided an image capturing and processing system. The system comprises an imaging device for capturing an image; and a hardware image processor for receiving the image and executing the method as delineated above and optionally and preferably as further detailed below.

According to some embodiments of the invention the system is a component in a device selected from the group consisting of a smartphone, a tablet and a smartwatch.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 2:
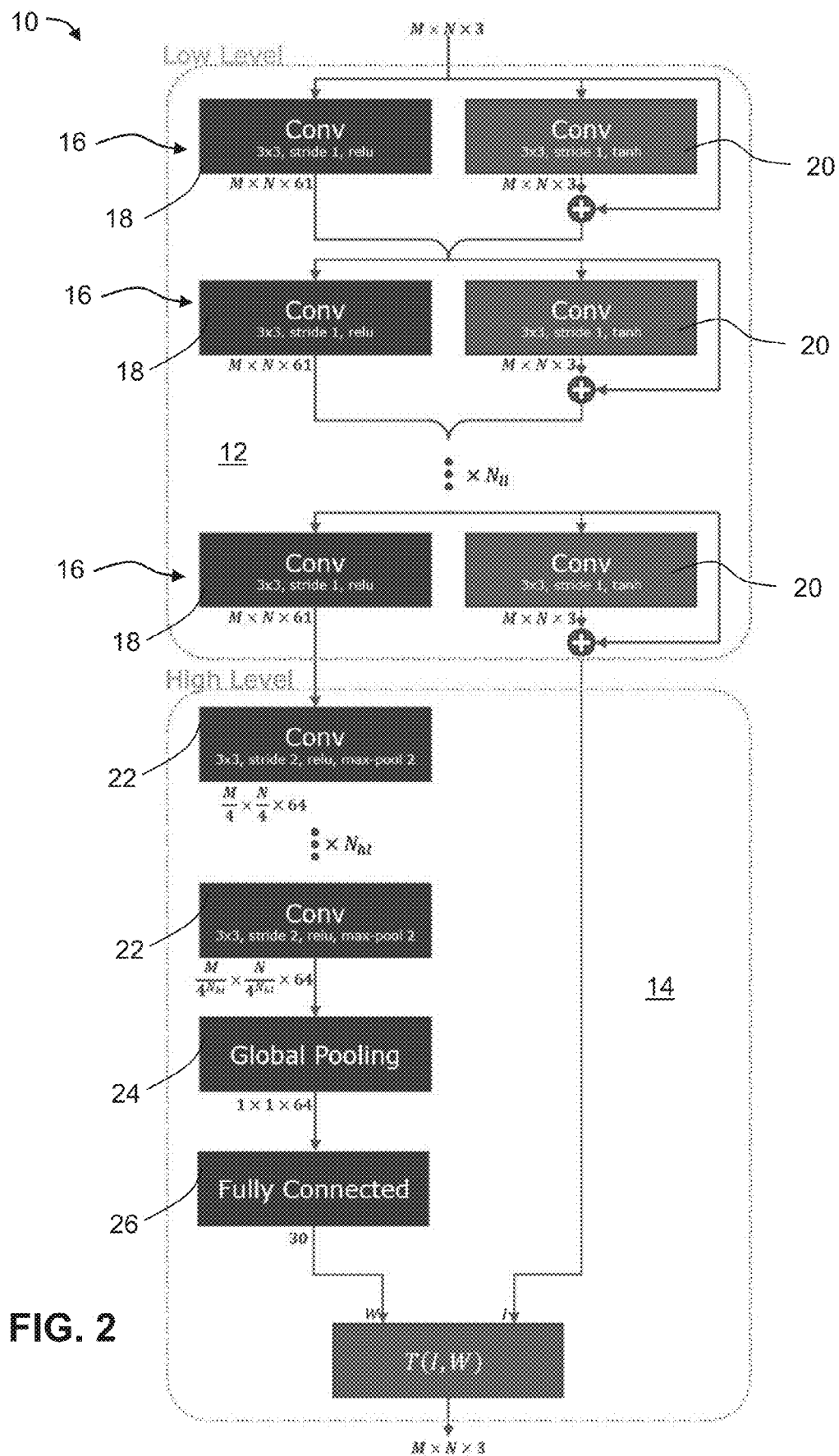

FIGS. 1A-E show images obtained during image processing experiments performed using a deep learning network according to some embodiments of the present invention;

FIG. 2 is a schematic illustration of an exemplified deep learning network, according to some embodiments of the present invention.

Figure 3A:
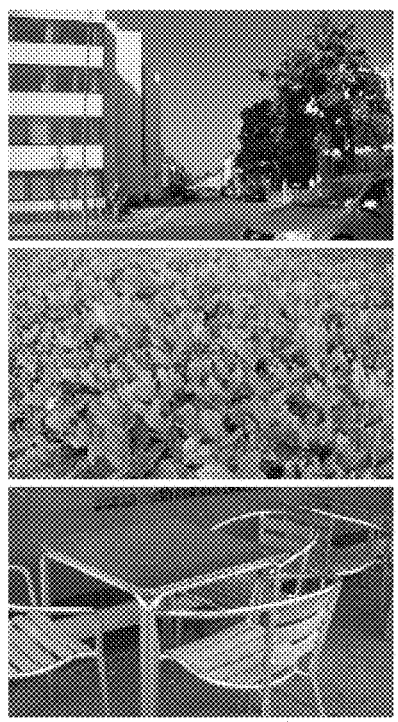
Figure 3B:
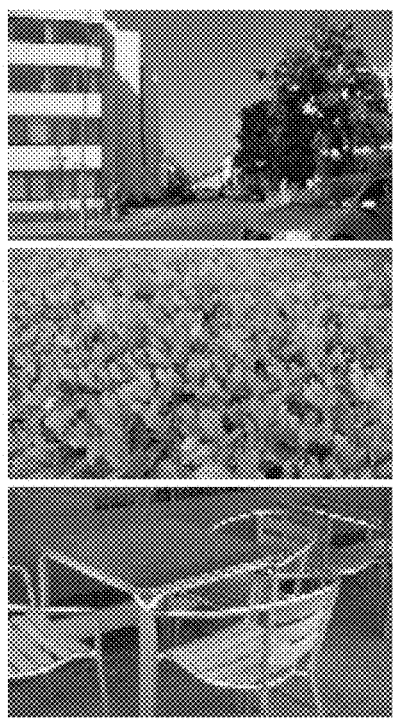
Figure 3C:
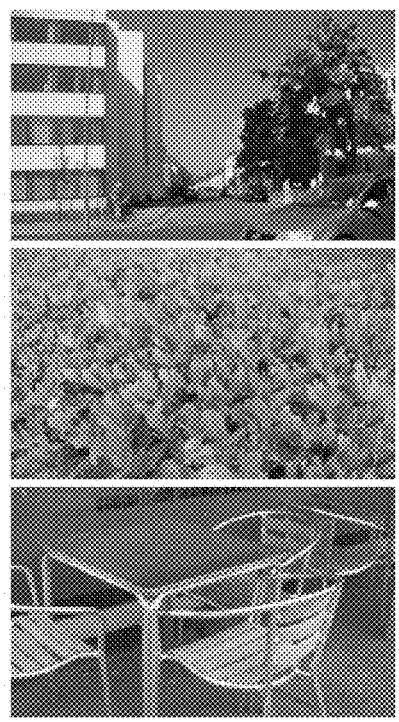
Figure 4A:
Figure 4B:
Figure 4C:
Figure 4D:
Figure 5:
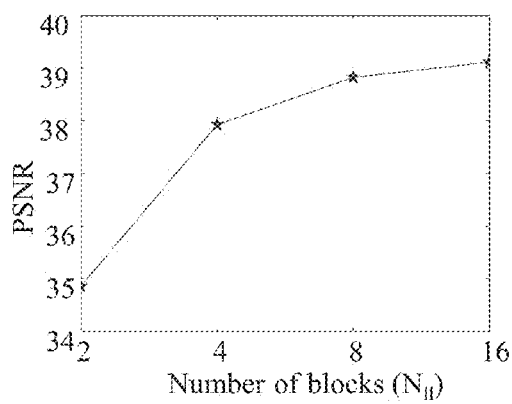
Figure 6:
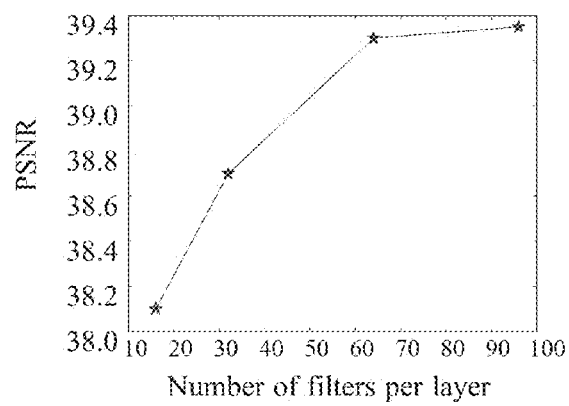
Figure 7:
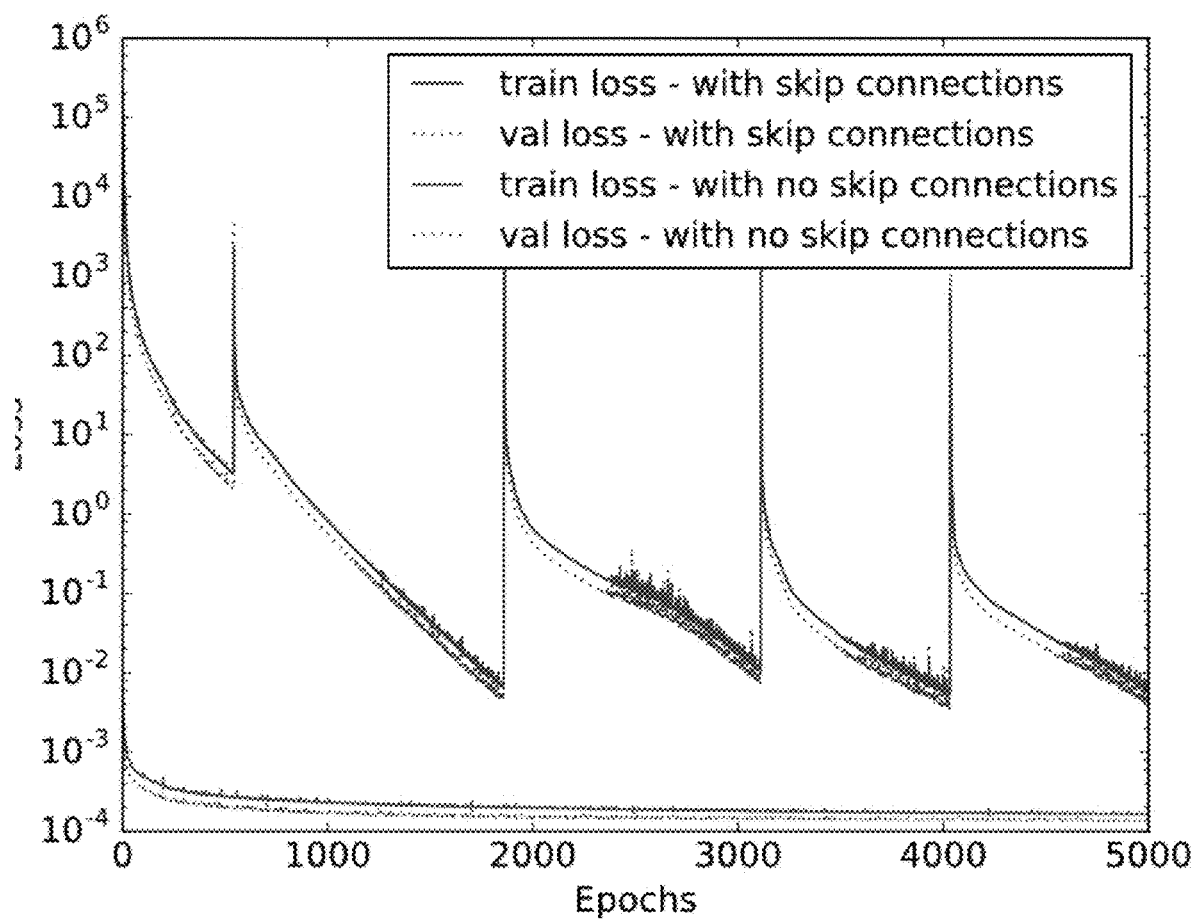
Figure 8:
Figure 9:
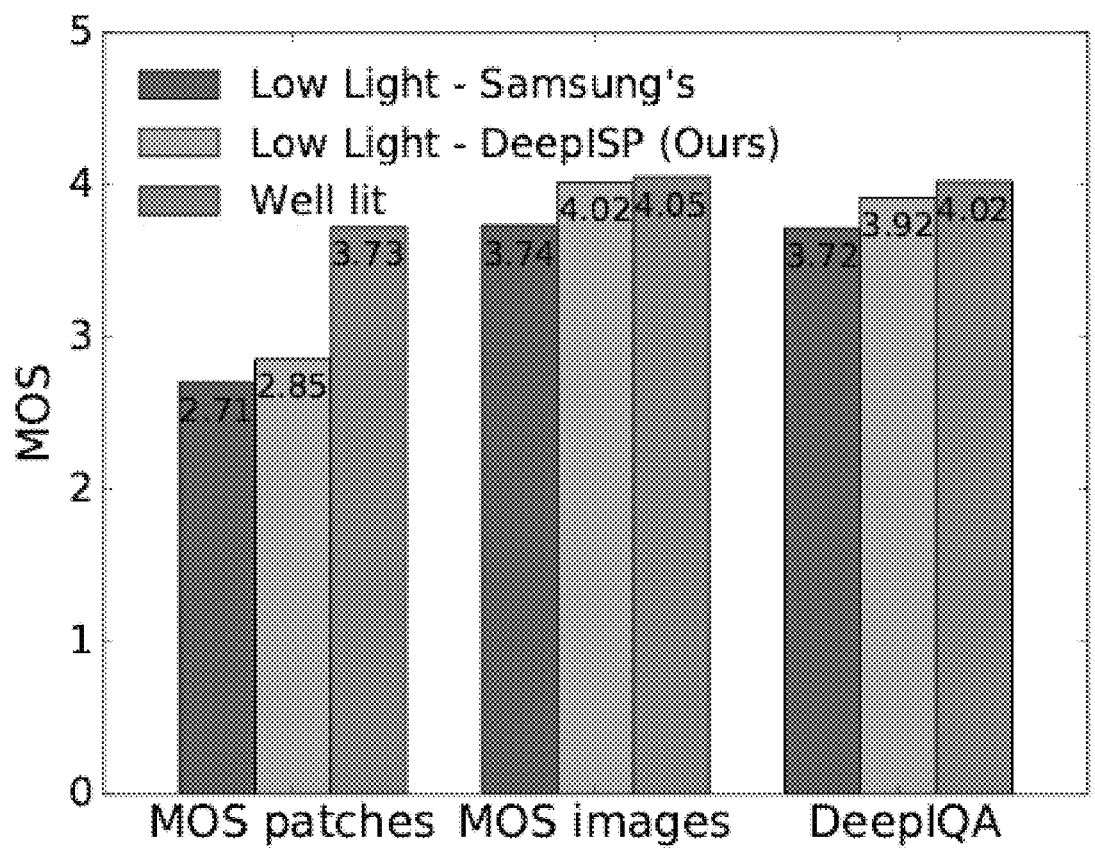
Figure 10:
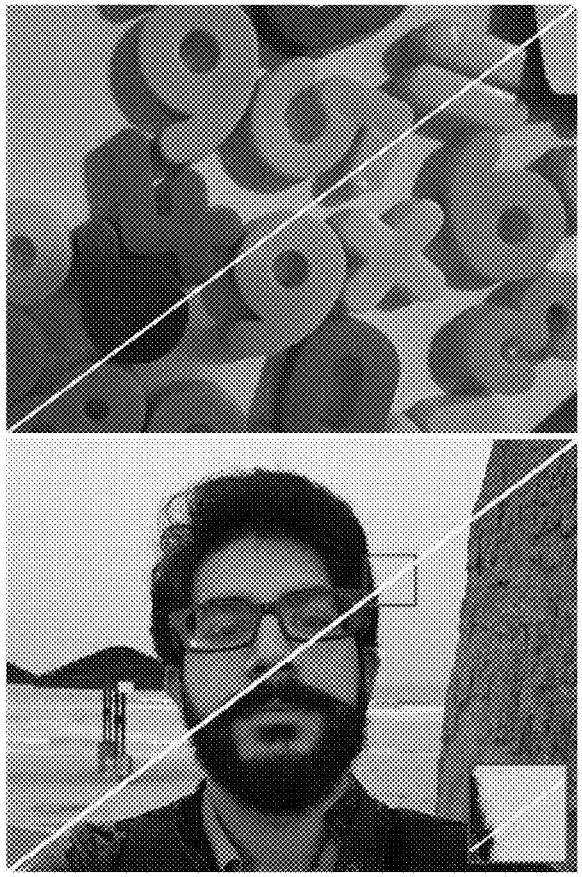
Figure 11:
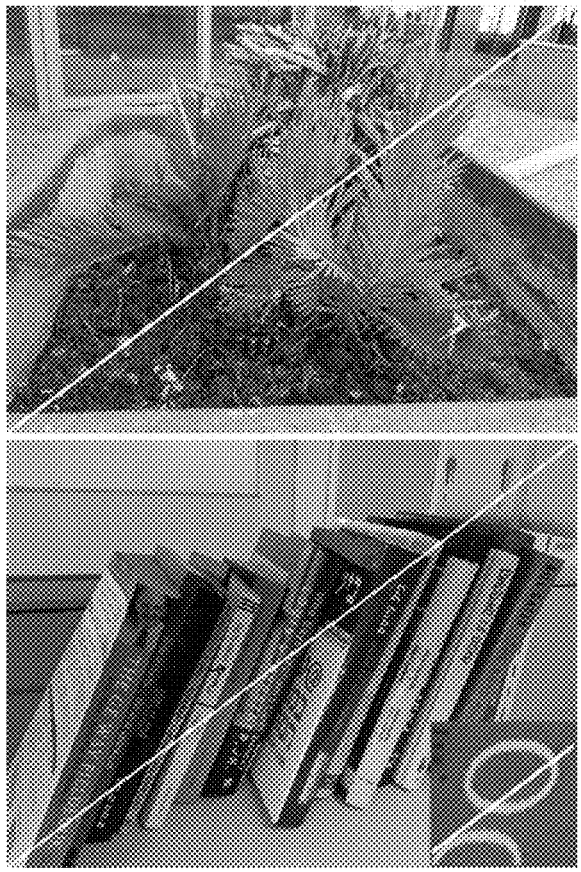
Figure 13:
Figure 14:
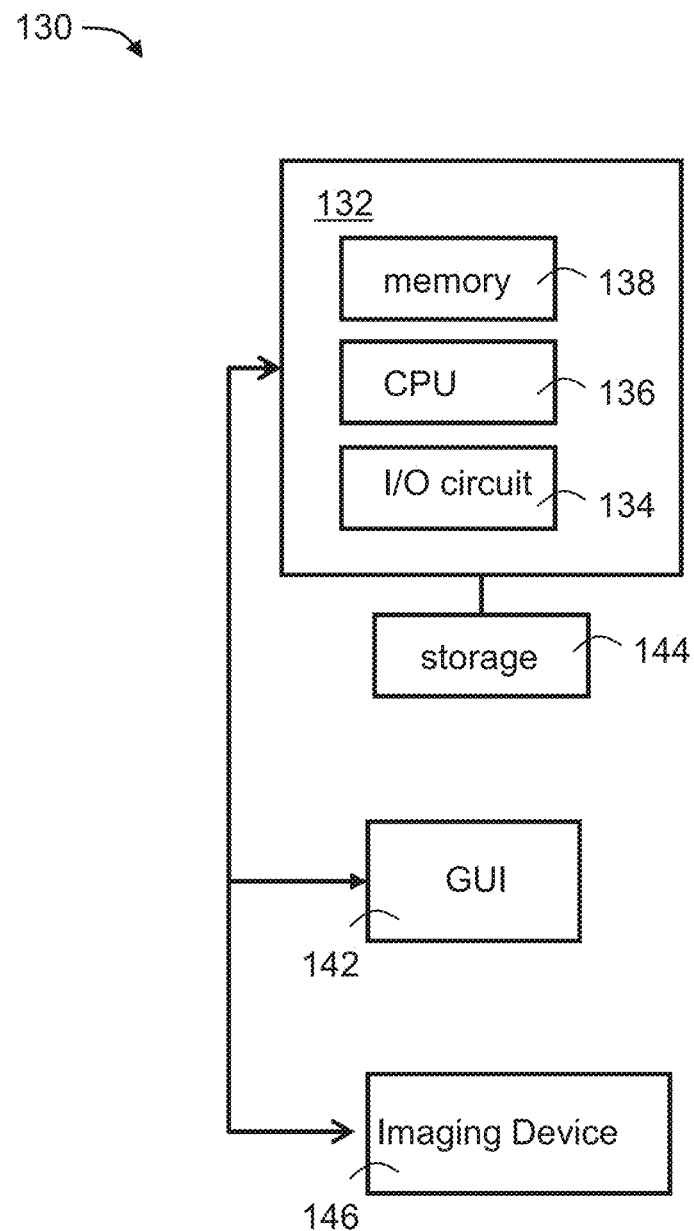

FIGS. 3A-C show visual examples of restoration results obtained during a joint denoising and demosaicing experiment performed according to some embodiments of the present invention, using a low-level part of the deep learning network shown in FIG. 2;

FIGS. 4A-D are images demonstrating removal of artifact according to some embodiments of the present invention;

FIG. 5 shows peak signal-to-noise ratio (PSNR) performance as a function of the number of residual blocks, as obtained in experiments performed according to some embodiments of the present invention;

FIG. 6 shows PSNR performance as a function of the number of filters per layer, for a network with 20 layers, as obtained in experiments performed according to some embodiments of the present invention;

FIG. 7 is a graph showing loss as a function of epoch for deep-learning networks trained with and without skip connections, as obtained in experiments performed according to some embodiments of the present invention;

FIG. 8 shows a user interface presented to human evaluators during experiments performed according to some embodiments of the present invention;

FIG. 9 shows mean opinion score (MOS) results obtained in experiments performed according to some embodiments of the present invention;

FIG. 10 shows images obtained during image processing experiments performed using a deep learning network applied to well-lit input images according to some embodiments of the present invention;

FIG. 11 shows comparison between images obtained using a deep learning network in which features are shared among a low-level and a high-level parts of the network, and a deep learning network in which features are not shared among the low-level and high-level parts of the network;

FIGS. 12A-D show additional images obtained during image processing experiments performed using a deep learning network according to some embodiments of the present invention;

FIG. 13 show thumbnails of captured scenes used in experiments performed according to some embodiments of the present invention; and FIG. 14 is a schematic illustration of a system having a hardware image processor, according to some embodiments of the present invention.

DESCRIPTION OF SPECIFIC EMBODIMENTS OF THE INVENTION

The present invention, in some embodiments thereof, relates to image processing and, more particularly, but not exclusively, to a method and a system for end-to-end image processing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

At least part of the operations described herein can be can be implemented by a data processing system, e.g., a dedicated circuitry or a general purpose computer, configured for receiving data and executing the operations described below. At least part of the operations can be implemented by a cloud-computing facility at a remote location.

Computer programs implementing the method of the present embodiments can commonly be distributed to users by a communication network or on a distribution medium such as, but not limited to, a flash memory device and a portable hard drive. From the communication network or distribution medium, the computer programs can be copied to a hard disk or a similar intermediate storage medium. The computer programs can be run by loading the code instructions either from their distribution medium or their intermediate storage medium into the execution memory of the computer, configuring the computer to act in accordance with the method of this invention. All these operations are well-known to those skilled in the art of computer systems.

Processing operations described herein may be performed by means of processer circuit, such as a DSP, microcontroller, FPGA, ASIC, etc., or any other conventional and/or dedicated computing system.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

Some embodiments of the present invention comprise a DL network that can be used within an image processing pipeline or instead of an image processing pipeline. The DL network of the present embodiments is referred to as DeepISP. In various exemplary embodiments of the invention the DeepISP jointly learns low-level corrections, such as demosaicing, denoising and sharpening, and higher level global image restoration in an end-to-end fashion. The inventors found that different tasks in this pipeline can be performed better when performed simultaneously. In addition, it has an advantage with respect to computational efficiency as computed features are shared between the different tasks.

FIG. 2 is a schematic illustration of the architecture of an exemplified DeepISP 10, according to some embodiments of the present invention. DeepISP 10 is composed of two parts, depicted at 12 and 14. Part 12 extracts low-level features and performs local modifications. Part 14 extracts higher level features and performs a global correction. The network is optionally and preferably fully convolutional, so as to accommodate any input image resolution.

Low-level features typically describe regions within the respective image bit not their semantic meaning, e.g., irrespectively of the identification of objects or orientations of objects that are contained within the respective image. Low-level features typically describe individual pixels of the image or patches of pixels (e.g., patches having from 2 to 5 or from 2 to 10 pixels along their largest dimension). For example, low-level features can include information regarding color assignment for a mosaiced or preliminary demosaiced image, information regarding noise components within the image, information regarding textures, and information regarding local contrast and/or local gray scale or color variations or gradients. High level features typically describe objects or orientations of objects that are contained within the respective image, optionally and preferably also classifying them according to semantic meaning. High level features typically describe the entire image or groups of several patches. For example, high-level features can include information regarding the shapes and objects that are contained in the image, and optionally and preferably also regarding edges and lines that are contained in the image (albeit information pertaining to some of the edges and lines, or some portions of the edges and lines, e.g., corners, can be included in low-level features as well).

The term "feature," as used herein, may refer to any characteristic of an item of data that may be used to determine whether the item of data falls within one or more specific categories of imagery information. Typically, a feature includes a measure or a value that can be used to distinguish one or more properties of a pixel, a patch, a group of patches or the entire image.

The low-level part 12 of DeepISP 10 optionally and preferably consists of $N_{II}$ blocks 16. Typical values for $N_{II}$ are from about 5 to about 50, more preferably from about 10 to about 40, more preferably from about 10 to about 30, more preferably from about 10 to about 20. In some Experiments performed by the present inventors, the value of $N_{II}$ was set to 15 and some Experiments performed by the present inventors, the value of $N_{II}$ was set to 20.

Each intermediate block performs convolution with filters. The size of the filters is typically 3×3 and their stride is typically 1, but other filter sizes and strides are also contemplated in some embodiments of the present invention.

The input and output sizes of each block are M×N×C, where M and N are the input image dimensions, and C is the number of channels, which can be from about 32 to about 256, more preferably from about 32 to about 128, e.g., about 64. In some embodiments of the present invention the same input dimensions are maintained. This can be done for example, by applying reflection padding to the input. The input to the network can be raw image input, or, more preferably, an input demosaiced RGB image produced, for example, by a bilinear interpolation in a preprocessing stage. In the latter embodiment, part 12 can optionally and preferably applies additional demosaicing.

For 3-color images (e.g., RGB images), at each layer, C-3 channels shown at 18 are feed-forward features (left column in FIG. 2), and the remaining 3 channels shown at 20 contain a correction for the RGB values of the previous block. The present embodiments also contemplated images of more colors, in which case at each layer, $C-N_c$ channels 18 are feed-forward features, and the remaining $N_c$ channels 20 contain a correction for the color values of the previous block, where $N_c$ is the number of colors in the image.

The image channels 20 contain a residual image that is added to the estimation of the previous layer. The first block of the network has a similar structure but with only the $N_c$ channels (3 in the present Example) of the input image (and not C channels as the other blocks). Unlike channels 18 that carry low-level features, channels 20 carry only the residual image (as corrected while being fed from one layer to the other), but not the low-level features (such as, the low-level features described above) associated with it. Each of the $N_c$ channels 20 optionally and preferably contains one of the colors of the residual image. The $C-N_c$ channels 18 of a particular layer contain the features that are associated with the residual image contained by the $N_c$ channels 20 of this particular layer. For example, for an RGB image, one of channels 20 can contain the red pixels of the residual image, one of channels 20 can contain the green pixels of the residual image, one of channels 20 can contain the blue pixels of the residual image, and the C-3 channels 18 can contain the low-level features associated with the residual RGB image. In some embodiments of the present invention, each of channels 18 contains information of a different low-level feature. However, this need not necessarily be the case, since, for some applications the low-level features are mixed, so that at least one of channels 18 contains two or more low-level features.

Many types of activation functions that are known in the art can be used in the blocks of part 12, including, without limitation, Binary step, Soft step, TanH, ArcTan, Softsign, Inverse square root unit (ISRU), Rectified linear unit (ReLU), Leaky rectified linear unit, Parameteric rectified linear unit (PReLU), Randomized leaky rectified linear unit (RReLU), Exponential linear unit (ELU), Scaled exponential linear unit (SELU), S-shaped rectified linear activation unit (SReLU), Inverse square root linear unit (ISRLU), Adaptive piecewise linear (APL), SoftPlus, Bent identity, SoftExponential, Sinusoid, Sinc, Gaussian, Softmax and Maxout. A suitable activation function for the feature blocks 18 is ReLU or a variant thereof (e.g., PReLU, RReLU, SReLU), but other activation functions are also contemplated. A suitable activation function for the residual images 20 is tanH, but other activation functions are also contemplated.

Part 12 optionally and preferably applies small convolutions. Each block 16 produces a residual image. Unlike conventional techniques, where all residual images are accumulated at the last layer, DeepISP 10 performs the summation at each block, thus allowing the network to get at each level the current image estimate in addition to the calculated features. In FIG. 2, layers that output features are shown on the left side of parts 12 and 14, and layers that output images or residual images are shown on the right side of part 12 and the center of part 14.

The last block at the low-level part 12 forwards to the high-level part 14 the $C-N_c$ feature channels in one path, and the currently estimated image (I) in another path. The latter uses the features from the low-level part 12 for estimating a transformation W that is then applied to the image (I) to produce a global correction of the image.

Part 14 optionally and preferably includes a sequence of $N_{hl}$ convolution layers 22 with filters. Typical values for $N_{hl}$ are from about 2 to about 10, more preferably from about 2 to about 6, more preferably from about 2 to about 4. In some Experiments performed by the present inventors, the value of $N_{hl}$ was set to 3.

Each block in part 14 performs convolution with filters. The size of the filters is typically 3×3 and their stride is typically 2, but other filter sizes and strides are also contemplated in some embodiments of the present invention.

Each layer is optionally and preferably followed by a max-pooling, which In some embodiments of the present invention is a 2×2 max-pooling. The purpose of the strides and pooling is getting a large receptive field and lowering the computational cost. A global mean-pooling 24 is optionally and preferably applied to the output of these convolutions, resulting in a single feature vector. This is optionally and preferably followed by a fully connected layer 26 that produces parameters of the transformation W.

A representative example for a function that can be used for the transformation is quadratic function of the pixel's R, G, and B components, but other types of functions, preferably non-linear functions, can are also contemplated. A quadratic function suitable for the present embodiments can be written as:

$$W \cdot triu([rgb1]^T \cdot [rgb1]), \quad (1)$$

where triu(·) is the vectorized form of the elements in the upper triangular of a matrix (to discard redundancies such as r·g and g·r). The operator $W \in R^{3 \times 10}$ maps the second-order monomials of each pixel to a new RGB value. The inventors found that such family of transformations has the advantage of pairing raw low-light and processed well-lit images, a pairing for which linear regression is inadequate. As demonstrated in the Examples section that follows, a non-linear (e.g., quadratic) transformation produces pleasant looking images.

Unlike conventional techniques in which a model is learned to predict a local transformation that is then applied to an input image, the transformation applied in DeepISP 10 is preferably global. The choice of global transformation is counterintuitive since it is known to be less suitable for learning classical local tone mapping used for HDR. The Inventors found, however, that when combined with the low-level part of the network, which applies local additive corrections, the usage of a global transformation is sufficient and enjoys better convergence and stability.

Known in the art, are techniques for calculating a loss for image restoration using $l_2$-distance. While it optimizes mean squared error (MSE), which is directly related to the peak signal-to-noise ratio (PSNR), the Inventors found that it leads to inferior results with respect to perceptual quality compared to other loss functions.

When training the network only for the task of joint denoising and demosaicing (i.e., using only part 12), an $l_2$-loss can be used, and the performance can be expressed in terms of peak signal-to-noise ratio (PSNR). Yet, it is recognized that in the case of full ISP, PSNR is less suitable because a small deviation in the global color results in a very large error (and low PSNR), while having no effect on perceptual quality. In this case, a combination of the Qi norm and a multi scale structural similarity index (MS-SSIM) can be used to obtain a higher perceptual quality.

A loss function for the full ISP case can be defined, for example, in the Lab domain. Because the network typically operates in the RGB color space, for calculating the loss, an RGB-to-Lab color conversion operator can be applied to the network output. This operator is differentiable and it is easy to calculate its gradient. The $l_1$-loss can be computed on all the three Lab channels. The MS-SSIM is optionally and preferably evaluated only on the luminance (L) channel:

$$Loss(\hat{I},I)=(1-\alpha)\|Lab(\hat{I})-Lab(I)\|_1+\alpha MSSSIM$$
$$(L(\hat{I}),L(I)). \quad (2)$$

The reasoning behind this design choice is to allow the network to learn both local (captured by MS-SSIM) and global (enforced by $l_1$) corrections. Applying MS-SSIM to the luminance channel allowed learning local luminance corrections even before the color (a and b channels) has converged to the target value. Also, MS-SSIM is based on local statistics and is mostly affected by the higher frequency information, which is of lower significance in the color channels.

FIG. 14 is a schematic illustration of a system 130 having a hardware image processor 132, which typically comprises an input/output (I/O) circuit 134, a hardware central processing unit (CPU) 136 (e.g., a hardware microprocessor), and a hardware memory 138 which typically includes both volatile memory and non-volatile memory. CPU 136 is in communication with I/O circuit 134 and memory 138. System 130 preferably comprises a graphical user interface (GUI) 142 in communication with processor 132. I/O circuit 134 preferably communicates information in appropriately structured form to and from GUI 142. Further shown, is an imaging device 146 such as a digital camera that is in communication with processor 132.

GUI 142, processor 132 can be integrated together within the same housing, for example, in smartphone device, or they can be separate units communicating with each other. Similarly, imaging device 146 and processor 132 can be integrated together within the same housing or they can be separate units communicating with each other.

GUI 142 can optionally and preferably be part of a system including a dedicated CPU and I/O circuits (not shown) to allow GUI 142 to communicate with processor 132. Processor 132 issues to GUI 142 graphical and textual output generated by CPU 136. Processor 132 also receives from GUI 142 signals pertaining to control commands generated by GUI 142 in response to user input. GUI 142 can be of any type known in the art, such as, but not limited to a touch screen, and the like. In preferred embodiments, GUI 142 is a GUI of a mobile device such as a smartphone, a tablet, a smartwatch and the like. When GUI 142 is a GUI of a mobile device, the CPU circuit of the mobile device can serve as processor 132 and can execute the code instructions described herein.

System 130 can further comprise one or more computer-readable storage media 144. Medium 144 is preferably non-transitory storage medium storing computer code instructions as further detailed herein, and processor 132 executes these code instructions. The code instructions can be run by loading the respective code instructions into the execution memory 138 of processor 132. Storage medium 144 preferably also store a trained DeepISP as further detailed hereinabove.

Storage medium 144 can store program instructions which, when read by the processor 132, cause the processor to receive an input image and to execute the method as described herein. In some embodiments of the present invention, an input image is generated by imaging device 146 and is transmitted to processor 132 by means of I/O circuit 134. Processor 132 can apply the trained DeepISP of the present embodiments to provide an output image as further detailed hereinabove. Processor 130 can display the output image on GUI 142, store it in storage medium 144, and/or transmit to a remote location (e.g., upload it to a cloud storage facility, transmit it directly to another system, such as, but not limited to, another smartphone, or the like).

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

The following Examples present a full end-to-end deep neural model of the camera image signal processing (ISP) pipeline, referred to as DeepISP. A deep learning (DL) procedure learns a mapping from the raw low-light mosaiced image to the final visually compelling image, and encompasses both low-level tasks such as demosaicing and denoising and higher-level tasks such as color correction and image adjustment. The training and evaluation of the pipeline described in the following examples were performed on a dedicated dataset containing pairs of low-light and well-lit images captured by a Samsung® S7 smartphone camera in both raw and processed JPEG formats. The following examples demonstrate state-of-the-art performance in objective evaluation of PSNR on the subtask of joint denoising and demosaicing. For the full end-to-end pipeline, following examples demonstrate visual quality compared to the manufacturer ISP, in both a subjective human assessment and when rated by a deep model trained for assessing image quality.

DL-based methods, and more specifically convolutional neural networks (CNNs), have demonstrated considerable success in such image processing tasks. For example, these models have produced state-of-the-art results for demosaicing [1], [2], denoising [3]-[9], deblurring [10]-[15] and super-resolution [16]-[20]. Traditional image processing algorithms commonly rely on hand-crafted heuristics, which require explicitly defining the prior on natural images statistics. Some examples of priors used in the literature are: a sparse representation in a redundant dictionary [21], local smoothness [22] and non-local similarity [23]. An advantage of DL-based methods is their ability to implicitly learn the statistics of natural images. Recent research has demonstrated that CNNs are inherently good at generating high-quality images, even when operating outside the supervised learning regime, e.g., [24] and [25].

Some studies have explored the application of deep learning for other image enhancement tasks. For example, the mapping between pairs of dark and bright JPEG images is learned in [26]. Another example is learning a mapping from mobile camera images to DSLR images [27]. These works, however, do not perform end-to-end processing. Rather, they begin from an image already processed by an ISP.

Conditional generative adversarial networks (CGANs) are another common approach for image enhancement. These models consist of a generator and a discriminator. The generator maps the source domain distribution to an output domain distribution given an input image. The learning is accomplished by having a discriminator that learns to distinguish between generated images and real images and optimizing the generator to fool the discriminator. In one example, color correction for underwater images was learned using such an adversarial loss (in addition to other loss terms) [28]. More examples of generative adversarial networks used for image restoration are superresolution [18] and blind deblurring [15]. A main limitation of generative adversarial networks is that they are not very stable in training and tend to suffer from mode collapse, so only a subset of the domain distribution is generated. For this reason, the use of generative adversarial networks for image enhancement requires adding other loss terms.

In contrast to the traditional approach that solves independently the sequence of tasks performed in the standard ISP, DL allows to jointly solve multiple tasks, with great potential to alleviate the total computational burden. Current algorithms were only able to accomplish this for closely related tasks, such as denoising and demosaicing [29] or super-resolution and demosaicing [30]. These studies have shown the advantage of jointly solving different tasks. These examples demonstrate the ability to jointly learn in an end-to-end fashion the full image processing pipeline. Such an approach enables sharing information (features) between parts of the network that perform different tasks, which improves the overall performance compared to solving each problem independently.

Joint Denoising and Demosaicing

A. Evaluation

The DeepISP 10 was firstly evaluated on the task of joint denoising and demosaicing. The MSR demosaicing dataset [29] is generated by down-sampling a mosaiced image, so each pixel has its ground truth red, green and blue values. The noise in this dataset is designed to be realistic, the level of noise is estimated in the original image and applied to the down-sampled image. The standard deviation was measured for the mosaiced noisy images compared to their corresponding ground truth values. The obtained STD range was $\sigma \in [1,10]$. For the task of joint denoising and demosaicing, the Panasonic images in the MSR dataset were used for training, and the results are reported herein for both the Panasonic and Canon test sets (disjoint from the training sets).

As the denoising and demosaicing task requires only local image modifications, only the low-level part 12 of the network (the output of the last residual block) was used as the model output. The number of blocks was set to $N_{II}=20$. The mosaiced raw image was transformed to an RGB image by bilinear interpolation during the preprocessing stage. The test set was retained as specified in the dataset and the remaining 300 images were split into 270 for training and 30 for validation. The resolution of all images was 132×220; although some were captured in portrait mode and some in landscape mode, all images were used in landscape orientation. The data were further augmented with random horizontal and vertical flipping. The network was trained for 5000 epochs using the Adam optimizer with learning rate $5\times10^{-5}$, $\beta_1=0.9$, $\beta_2=0.999$ and $\varepsilon=10^{-8}$.

Some visual examples of the restoration results are shown in FIGS. 3A-C, where FIG. 3A shows output examples, FIG. 3B shows input (Bilinear) examples, and FIG. 3C shows the corresponding ground truth images. The artifacts caused by the interpolation are visible in FIG. 3B, and the network of the present embodiments learns how to remove them. A known challenge in demosaicing is the Moiré artifact, which is particularly observed in image locations with high frequency patterns. FIGS. 4A-D demonstrate how well the method of the present embodiments handles this artifact. Shown in FIGS. 4A-D are a ground truth image (FIG. 4A), an input (bilinear image) image (FIG. 4B), an image produced by the method in [2] (FIG. 4C), and an image produced by the method of the present embodiments. As shown, the method of the present embodiments removes the artifact even in cases where other methods fail (e.g., see the blue artifact on the far building in FIG. 4C).

Table 1 below summarizes the comparison to other methods on the MSR dataset. Apart for the last row, all numbers in Table 1 are taken from [2]. The results obtained using the method of the present embodiments is the last row of Table 1. The method of the present embodiments achieves the best results for joint denoising and demosaicing on both the Panasonic and Canon test sets in the MSR dataset. Compared to the previous state-of-the-art results (SEM by [2]), the method of the present embodiments produces an improvement of 0.38 dB (linear space) and 0.72 dB (sRGB space) on the Panasonic test set, and of 0.61 dB (linear) 1.28 dB (sRGB) on the Canon test set.

TABLE 1

| Method | Panasonic | | Canon | |
|---|---|---|---|---|
| | Linear | sRGB | Linear | sRGB |
| Matlab [34] | 34.16 | 27.56 | 36.38 | 29.1 |
| OSAP [35] | 36.25 | 29.93 | 39 | 31.95 |
| WECD [36] | 36.51 | 30.29 | — | — |
| NLM [37] | 36.55 | 30.56 | 38.82 | 32.28 |
| DMMSE [38] | 36.67 | 30.24 | 39.48 | 32.39 |
| LPA [39] | 37 | 30.86 | 39.66 | 32.84 |
| CS [40] | 37.2 | 31.41 | 39.82 | 33.24 |
| JMCDM [41] | 37.44 | 31.35 | 39.49 | 32.41 |
| RTF [29] | 37.77 | 31.77 | 40.35 | 33.82 |
| FlexISP [42] | 38.28 | 31.76 | 40.71 | 33.44 |
| DJDD [1] | 38.6 | 32.6 | — | — |
| SEM [2] | 38.93 | 32.93 | 41.09 | 34.15 |
| DeepISP 10 (Part 12) | 39.31 | 33.65 | 41.7 | 35.43 |

The experiment described in this Example corroborates the ability of the network of the present embodiments to generalize well to a different dataset (training on Panasonic images and testing on Canon images). This strength of is also noticeable with an improvement of 0.71 dB/1.05 dB obtained over another deep learning base method [1] on Linear/sRGB Panasonic. Note that only the MSR dataset, which contains a few hundred images, was used form training, while the training procedure in [1] uses, in addition, an external dataset with millions of images for mining hard examples and training on them.

B. Hyper-Parameters

The large number of residual blocks used in network 10 has two main effects. Firstly, it allows the network to learn more complicated functions with more parameters and more nonlinear units. Secondly, it generates larger receptive field.

For example, for N 3×3 convolution layers each pixel at the output is a function of 2N+1×2N+1 neighboring input pixels.

FIG. 5 shows PSNR performance as a function of the number of residual blocks. Increased performance observed for deeper network, reaching convergence, or diminishing returns, at about 16 layers.

FIG. 6 shows PSNR performance as a function of the number of filters per layer, for a network with 20 layers. The number of filters per layer affects the expressiveness of the model. Convergence is reached at about 64 filters per layer. Note that increasing the number of filters by a factor a results in a factor $a^2$ in the number of parameters, while the parameters number scales only linearly with number of layers.

C. Effect of Skip Connections

Training very deep networks has problems with convergence due to vanishing or exploding gradients. Vanishing gradients are caused when the gradient of the loss with respect to a parameter is too small to have any effect. Exploding gradients is the result of accumulated error in the calculation of the update step. Both are more apparent in very deep networks because there is a long path of layers between the loss and the first layers of the network, which implies many multiplications in the backward pass that are very likely to either converge to zero or explode.

Skip connections, or "residual blocks", were suggested in [43] as a way of having shorter paths from the output of the network to the first layers. These blocks compute the residual features and have been proven to be very successful for classification models. The present Inventors found that same holds for using residual blocks for regression networks, as used in the model of the present embodiments. To show the advantage of skip connections a model where the skip connections have been removed was trained. FIG. 7 shows loss as a function of the epoch with and without skip connections model. Without skip connections the training is not stable and after 5000 epochs reaches a loss 2 order of magnitude higher than the same model with skip connections.

Full ISP

A. S7-ISP Dataset

To assess the collective performance of both parts 12 and 14 of network 10, a dataset of real-world images was generated. For this purpose, different scenes were captured using a Samsung S7 rear camera. A special Android application was developed to capture a sequence of images while the Samsung S7 device is on a tripod and without having to touch it (to avoid camera movement).

While the scenes were chosen to contain minimal motion, a total lack of motion during the acquisition process cannot be guaranteed because the capturing was not performed in a lab setting. For each scene, a JPEG image was captured using the camera fully automatic mode and the original raw image was saved as well. In addition, a low-light image of the same scene was captured, and stored in both JPEG and raw formats. The lowlight image was emulated by capturing the same scene with the exact same settings as those chosen by the camera in the automatic mode, except the exposure time that was set to be quarter of the automatic setting. Since the camera supports only a discrete set of predefined exposure times, the closest supported value was selected.

A total of 110 scenes were captured and split to 90, 10 and 10 for the training, validation and test sets, respectively. The relatively small number of images in the dataset was compensated by their 3024×4032 (12M pixel) resolution. Thus, when training on patches, this dataset effectively contains many different samples. Even for relatively large 256×256 patches, it effectively contains over 20 thousand of non-overlapping patches (and more than a billion different patches). The scenes captured include indoors and outdoors, sun light and artificial light. Thumbnails of the captured scenes are displayed in FIG. 13.

B. Mean Opinion Score

To account for the fact that it is difficult to define an objective metric for the full pipeline, a subjective evaluation was performed. To this end, the mean opinion score (MOS) was generated for each image using Amazon Mechanical Turk to quantitatively assess its quality. Two types of experiments were performed. The first experiment involved full images, where human evaluators were presented with a single image and were asked to rate its quality on a scale from 1 (bad) to 5 (excellent). In the second experiment, for rating the quality of details, evaluators were presented with multiple versions of the same patch side by side and were asked to rate each of them. The displayed patch size was set to 512×512 pixels (about 2% of the total image). Evaluators were instructed to rate the image quality according to factors like natural colors, details and sharpness (not the content of the image, e.g., composition). Each evaluator was provided the opportunity to rate a specific example only once, but the exact same evaluators did not rate all examples. The user interface presented to the evaluators is shown in FIG. 8. Each of the three patches at the lower part of FIG. 8 is accompanied by a rating scale of: 1 Bad, 2 Poor, 3 fair, 4 Good and 5 Excellent.

In addition to scoring by humans, image quality was also evaluated by a learned model from [44] that was trained to estimate human evaluations. The model output was normalized to the range [1,5].

C. DeepISP Evaluation

The DeepISP 10 was tested on the challenging task of learning the mapping between low-light raw input images to well-lit JPEG images produced by the Samsung S7 ISP in automatic setting. The mosaiced raw image was transformed to RGB by bilinear interpolation as a preprocessing stage. DeepISP 10 was used with $N_{ll}$=15 and $N_{hl}$=3. For the MS-SSIM part of the loss, patches of 5×5 were used at two scales. The network was trained with a batch containing a single 1024×1024 patch cropped at random at each epoch from one of the training images. The data were augmented with random horizontal flipping. The training lasted for 700 epochs using the ADAM optimizer with the following parameters: a learning rate $5\times10^{-5}$, $\beta_1$=0.9, $\beta_2$=0.999 and $\epsilon=10^{-8}$.

For faster convergence, the parameters of the learned operator W were initialized with an affine operator $W_{init} \in R^{3\times 4}$. In this initialization, $W_{init}$, only the first-order monomials of each pixel were mapped to a new RGB value, so it did not contain the elements that correspond to second-order monomials (they were initialized to zero in W). Linear regression from input pixels to target pixels was applied for each sample in the training set to get such an affine operator. As several operators were obtained in this way, $W_{init}$ was set to the average of them. A linear transformation $W_i \in R^{3\times 4}$ was used a as the initialization of the full operator $W \in R^{3\times 10}$, zeroing its non-linear coefficients, due to this averaging operation. Unlike the affine operator, an average of multiple full operators did not lead to a reasonable operator. In other words, this average of several transforms in $R^{3\times 10}$ did not generate plausible images and did not serve as a good starting point for the optimization.

It is recognized that a camera ISP can typically handle with motion artifacts, which are missing in the dataset used in this Example. Nevertheless, learning to generate high quality images with a shorter exposure time can help mitigating such artifacts.

To evaluate the reconstruction results we use mean opinion score (MOS), which has been generated using the Amazon Mechanical Turk for both full images and patch level as specified above. A total of 200 ratings have been collected for each image (200 per version of an image, i.e., DeepISP output, Samsung S7 output and the well-lit ground truth): 100 ratings for 10 random patches and additional 100 for the full image.

FIG. 9 presents the MOS results. The leftmost group of bars shows average human rating scores for random 512× 512 patches, the middle group of bars shows average human rating scores of the full images, and the rightmost group of bars shows raating generated by a deep learning-based method for evaluating image quality [44]. In each group of bars, the leftmost bar corresponds to Samsung S7 ISP output for low-light images, the middle bar corresponds to the output of network 10 of the present embodiments for the same raw image, and the rightmost bar corresponds to Samsung S7 ISP output for a well-lit scene, which serves as a ground truth. As shown, for the patch level, DeepISP MOS is 2.86 compared to Samsung S7 ISP which has 2.71 on the same images. The DeepISP MOS for full images is 4.02 compared to 3.74 achieved by Samsung S7 ISP. The former result is only slightly inferior to the MOS 4.05 that is given to the well-lit images.

Figures 12A, 12B, 12C, 12D:
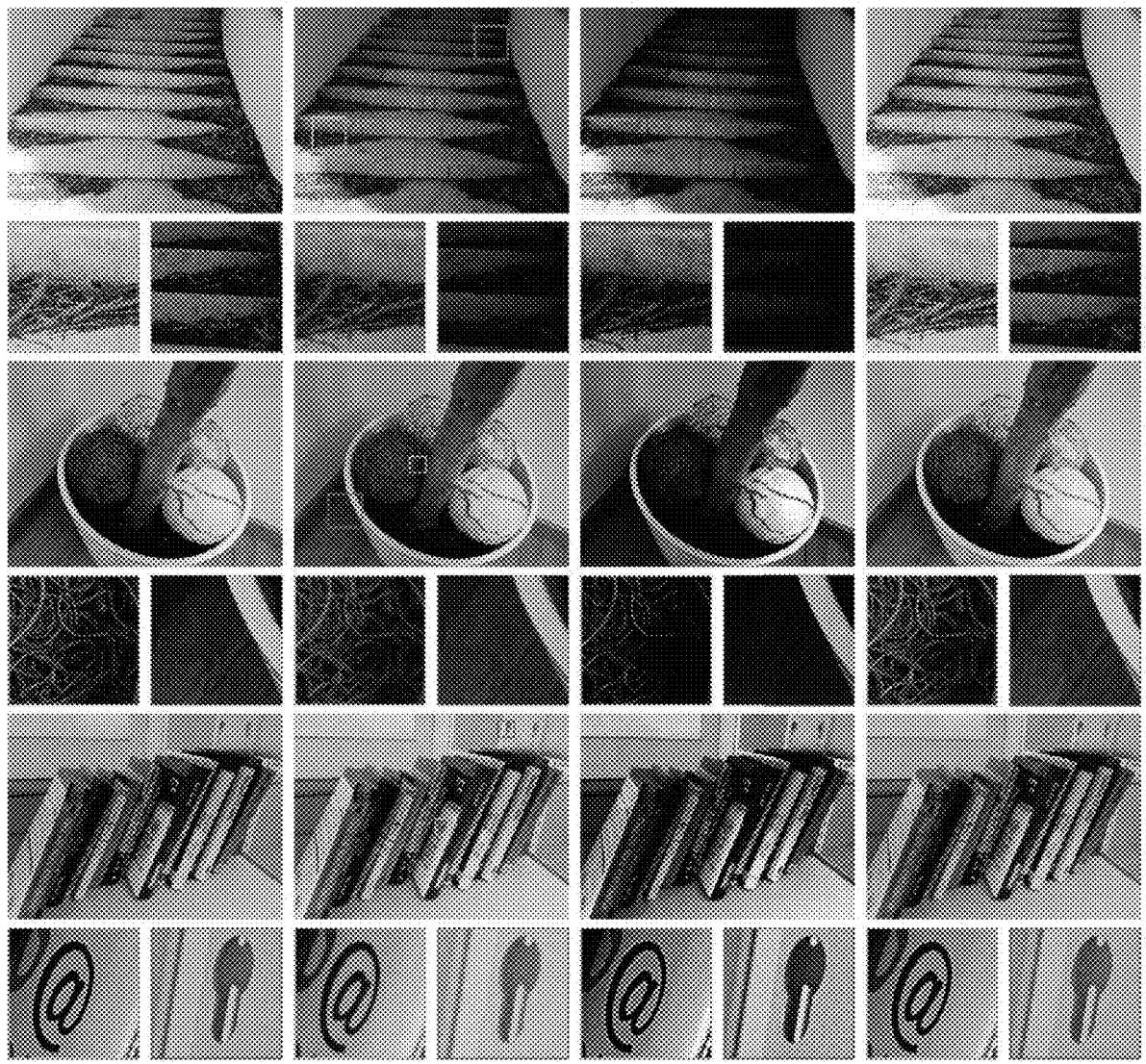

It is evident that the visual quality score predicted by DeepIQA [44] corresponds well to the human evaluation with scores of 3.72, 3.92 and 4.02 for the Samsung S7 ISP, DeepISP and the well-lit scene, respectively. FIGS. 1A-E and 12A-D present a selection of visual results. Since Samsung's low-light images are quite dark (to suppress visible noise), all images are presented (and have been evaluated) after a simple histogram stretching to have a fair comparison. The luminance channel histogram has been stretched to cover the range [0-255] with 5% saturation at the high and low boundaries of the range. Samsung's original low-light images (after the Samsung ISP but before the histogram applied in this Example) are rated about 1 point lower on the MOS compared to the same images after histogram stretching. FIGS. 1A and 12A show exemplified ground truth well-lit images, FIGS. 1B and 12B show the corresponding raw input low-light images (for visualization purposes, after demosaicing by bilinear interpolation), FIGS. 1C and 12C show the corresponding output of the Samsung S7 ISP (after histogram stretch), and FIGS. 1D and 12D shows the corresponding output of network 10.

DeepISP for Well-Lit Images

While the examples above are described with a particular emphasis to low-light images, the DeepISP of the present embodiments can also be used for well-lit images. For this purpose, a similar DeepISP was trained for well-lit images. However, unlike the low-light case, in which a higher quality image was used as the ground truth, in this case, only the raw version and its processed JPEG version from the Samsung ISP are available. The DeepISP 10 was therefore trained to mimic the Samsung ISP, having the "well-lit" raw image (captured in fully automatic mode) as the input to the network and the JPEG as its target "ground truth".

In the training phase, the training procedure, the hyperparameters, and the number of epochs were the same as for the low-light processing experiment described above. The initial transformation $W_t$ for the high-level part, was computed for these inputs in the same way described for the low-light case. The results are shown in FIG. 10. The upper-left triangles in FIG. 10 are the output of DeepISP 10, and the lower-right triangles in FIG. 10 are Samsung's output. FIG. 10 demonstrates that even though in this Example the network was trained in sub-optimal conditions (since the target output was the JPEG image and not noiseless higher quality image), the DeepISP 10 was able to mimic the ISP and generate pleasant looking images. The images were indistinguishable from the ground truth when examining the full-scale image, and were close to the ground truth when examining details.

This experiment demonstrates that a neural model can learn to mimic an ISP given as a black box. Moreover, based on the good results achieved in this setting, combined with the good lowlight processing results achieved when the high-quality ground truth was given, it is envisioned that DeepISP 10 is likely to produce a better output when given a higher-quality ground truth at training.

Shared Features

A modified DeepISP was trained to study the effect of simultaneous learning of low- and high-level corrections. This experiment shows that given the same budget (number of layers and number of parameters) inferior results are obtained when the information is not shared. The results are shown in FIG. 11, where the upper-left triangle is the output of DeepISP 10 in which features of part 12 are shared with features of part 14, and the lower-right triangle is the output of a network in which the part 14 receives the output image of part 12 without sharing the feature among parts 12 and 14. As shown, when features are not shared, the model often fails to generate good-looking colors, and a degraded image quality is obtained.

This Example presented an end-to-end DL procedure that can be used to, or serve as a component in, a full ISP of a digital camera. Unlike conventional techniques that apply DL to individual tasks in the image processing pipeline, the method of the present embodiments applies all the tasks of the pipeline collectively. Such an approach has the advantage of sharing information while performing different tasks. This lowers the computational costs compared to the case when each processing step is performed independently. The steps that are excluded in this example, but are nevertheless contemplated according to some embodiments of the present invention are removing camera shake and/or blur, handling HDR images, and adapting the network for various levels of noise.

The DeepISP 10 of the present embodiments demonstrated in this Example its ability to generate visually compelling images from raw low-light images. The output of the Samsung S7 ISP was used as the reference both with low-light and well-lit raw inputs. In the human evaluation of full images, images provided by DeepISP 10 scored about 7% higher than the manufacturer ISP and only about 0.7% below the equivalent well-lit images. Similar trends were observed with the DeepIQA measure.

With respect to the low-level part 12 of DeepISP 10, this Example demonstrated that in terms of an objective metric (PSNR) the performance of this image processing task outperformed all state-of-the-art techniques by about 0.72 dB PSNR. This Example also demonstrated the ability of DeepISP 10 to generalize, outperforming by 1.28 dB PSNR over conventional techniques.

In some embodiments of the present invention a network similar to DeepIQA can be used to further improve the perceptual quality of DeepISP 10. It can be used as part of the loss and its gradients can be propagated through the networks. This may serve as an alternative to the conventional adversarial loss.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

[1] M. Gharbi, G. Chaurasia, S. Paris, and F. Durand, "Deep joint demosaicking and denoising," *ACM Transactions on Graphics (TOG)*, vol. 35, no. 6, p. 191, 2016.

[2] T. Klatzer, K. Hammernik, P. Knobelreiter, and T. Pock, "Learning joint demosaicing and denoising based on sequential energy minimization," in *Computational Photography (ICCP), 2016 IEEE International Conference on*. IEEE, 2016, pp. 1-11.

[3] T. Remez, O. Litany, R. Giryes, and A. M. Bronstein, "Deep class-aware image denoising," in *Sampling Theory and Applications (SampTA), 2017 International Conference on*. IEEE, 2017, pp. 138-142.

[4] K. Zhang, W. Zuo, S. Gu, and L. Zhang, "Learning deep cnn denoiser prior for image restoration," *arXiv preprint arXiv:* 1704.03264, 2017.

[5] H. C. Burger, C. J. Schuler, and S. Harmeling, "Image denoising: Can plain neural networks compete with bm3d?" in *IEEE Conference on Computer Vision and Pattern Recognition (CVPR)*. IEEE, 2012, pp. 2392-2399.

[6] W. Feng and Y. Chen, "Fast and accurate poisson denoising with optimized nonlinear diffusion," *arXiv, abs/*1510.02930, 2015.

[7] Y. Chen and T. Pock, "Trainable nonlinear reaction diffusion: A flexible framework for fast and effective image restoration," *IEEE Transactions on Pattern Analysis and Machine Intelligence (CVPR)*, 2016.

[8] O. T. R. Vemulapalli and M. Liu, "Deep gaussian conditional random field network: A model-based deep network for discriminative denoising," in *IEEE Conference on Computer Vision and Pattern Recognition (CVPR)*, 2016.

[9] K. Zhang, W. Zuo, Y. Chen, D. Meng, and L. Zhang, "Beyond a gaussian denoiser: Residual learning of deep cnn for image denoising," *IEEE Transactions on Image Processing*, vol. 26, no. 7, pp. 3142-3155, July.

[10] 2017.

[11] C. J. Schuler, M. Hirsch, S. Harmeling, and B. Scholkopf, "Learning to deblur," *IEEE transactions on pattern analysis and machine intelligence*, vol. 38, no. 7, pp. 1439-1451, 2016.

[12] L. Xu, J. S. Ren, C. Liu, and J. Jia, "Deep convolutional neural network for image deconvolution," in *NIPS*, 2014.

[13] J. Sun, W. Cao, Z. Xu, and J. Ponce, "Learning a convolutional neural network for non-uniform motion blur removal," in *CVPR*, 2015.

[14] A. Chakrabart, "A neural approach to blind motion deblurring," in *ECCV*, 2016.

[15] S. Su, M. Delbracio, J. Wang, G. Sapiro, W. Heidrich, and O. Wang, "Deep video deblurring," in *CVPR*, 2017.

[16] S. Nah, T. H. Kim, and K. M. Lee, "Deep multi-scale convolutional neural network for dynamic scene deblurring," in *CVPR*, 2017.

[17] J. Kim, J. K. Lee, and K. M. Lee, "Accurate image super-resolution using very deep convolutional networks," in *CVPR*, 2016.

[18] J. Bruna, P. Sprechmann, and Y. LeCun, "Super-resolution with deep convolutional sufficient statistics," in *ICLR*, 2016.

[19] C. Ledig, L. Theis, F. Huszar, J. Caballero, A. Cunningham, A. Acosta,' A. Aitken, A. Tejani, J. Totz, Z. Wang et al., "Photo-realistic single image super-resolution using a generative adversarial network," *arXiv preprint arXiv:* 1609.04802, 2016.

[20] T. Tong, G. Li, X. Liu, and Q. Gao, "Image super-resolution using dense skip connections," in *Proceedings of the IEEE Conference on Computer Vision and Pattern Recognition*, 2017, pp. 4799-4807.

[21] B. Lim, S. Son, H. Kim, S. Nah, and K. M. Lee, "Enhanced deep residual networks for single image super-resolution," in *CVPR Workshops*, 2017.

[22] M. Aharon, M. Elad, and A. Bruckstein, "rmk-svd: An algorithm for designing overcomplete dictionaries for sparse representation," *IEEE Transactions on signal processing*, vol. 54, no. 11, pp. 4311-4322, 2006. [22] L. I. Rudin, S. Osher, and E. Fatemi, "Nonlinear total variation based FIG. 13. Captured scenes from the S7-ISP dataset

[23] noise removal algorithms," *Physica D: Nonlinear Phenomena*, vol. 60, no. 1-4, pp. 259-268, 1992.

[24] A. Buades, B. Coll, and J.-M. Morel, "A non-local algorithm for image denoising," in *Computer Vision and Pattern Recognition, 2005. CVPR 2005. IEEE Computer Society Conference on*, vol. 2. IEEE, 2005, pp. 60-65.

[25] Y. Bahat, N. Efrat, and M. Irani, "Non-uniform blind deblurring by reblurring," in *Proceedings of the IEEE Conference on Computer Vision and Pattern Recognition*, 2017, pp. 3286-3294.

[26] D. Ulyanov, A. Vedaldi, and V. Lempitsky, "Deep image prior," *arXiv preprint arXiv:* 1711.10925, 2017.

[27] L. Shen, Z. Yue, F. Feng, Q. Chen, S. Liu, and J. Ma, "Msr-net: Low-light image enhancement using deep convolutional network," *arXiv preprint arXiv:* 1711.02488, 2017.

[28] A. Ignatov, N. Kobyshev, K. Vanhoey, R. Timofte, and L. Van Gool, "DSLR-quality photos on mobile devices with deep convolutional networks," arXiv preprint arXiv: 1704.02470, 2017.

[29] C. Li, J. Guo, and C. Guo, "Emerging from water: Underwater image color correction based on weakly supervised color transfer," *arXiv preprint arXiv:* 1710.07084, 2017.

[30] D. Khashabi, S. Nowozin, J. Jancsary, and A. W. Fitzgibbon, "Joint demosaicing and denoising via learned nonparametric random fields," *IEEE Transactions on Image Processing, vol.* 23, no. 12, pp. 4968-4981, 2014.

[31] S. Farsiu, M. Elad, and P. Milanfar, "Multiframe demosaicing and superresolution of color images," *IEEE transactions on image processing*, vol. 15, no. 1, pp. 141-159, 2006.

[32] M. Gharbi, J. Chen, J. T. Barron, S. W. Hasinoff, and F. Durand, "Deep bilateral learning for real-time image enhancement," *ACM Transactions on Graphics (TOG)*, vol. 36, no. 4, p. 118, 2017.

[33] C. Chen, Q. Chen, J. Xu, and V. Koltun, "Learning to see in the dark," *arXiv preprint arXiv:* 1805.01934, 2018.

[34] H. Zhao, O. Gallo, I. Frosio, and J. Kautz, "Loss functions for image restoration with neural networks," *IEEE Transactions on Computational Imaging*, vol. 3, no. 1, pp. 47-57, 2017.

[35] H. S. Malvar, L.-w. He, and R. Cutler, "High-quality linear interpolation for demosaicing of bayer-patterned color images," in *Acoustics, Speech, and Signal Processing, 2004. Proceedings. (ICASSP '04). IEEE International Conference on*, vol. 3. IEEE, 2004, pp. iii-485.

[36] Y. M. Lu, M. Karzand, and M. Vetterli, "Demosaicking by alternating projections: theory and fast one-step implementation," *IEEE Transactions on Image Processing*, vol. 19, no. 8, pp. 2085-2098, 2010.

[37] C.-Y. Su, "Highly effective iterative demosaicing using weighted-edge and color-difference interpolations," *IEEE Transactions on Consumer Electronics*, vol. 52, no. 2, pp. 639-645, 2006.

[38] A. Buades, B. Coll, J.-M. Morel, and C. Sbert, "Self-similarity driven color demosaicking," *IEEE Transactions on Image Processing*, vol. 18, no. 6, pp. 1192-1202, 2009.

[39] L. Zhang and X. Wu, "Color demosaicking via directional linear minimum mean square-error estimation," *IEEE Transactions on Image Processing*, vol. 14, no. 12, pp. 2167-2178, 2005.

[40] D. Paliy, V. Katkovnik, R. Bilcu, S. Alenius, and K. Egiazarian,

[41] "Spatially adaptive color filter array interpolation for noiseless and noisy data," *International Journal of Imaging Systems and Technology*, vol. 17, no. 3, pp. 105-122, 2007.

[42] P. Getreuer, "Contour stencils for edge-adaptive image interpolation," in *Proc. SPIE*, vol. 7246, 2009, pp. 323-343.

[43] K. Chang, P. L. K. Ding, and B. Li, "Color image demosaicking using inter-channel correlation and nonlocal self-similarity," *Signal Processing: Image Communication*, vol. 39, pp. 264-279, 2015.

[44] F. Heide, M. Steinberger, Y.-T. Tsai, M. Rouf, D. Pajak, D. Reddy, O. Gallo, J. Liu, W. Heidrich, K. Egiazarian et al., "Flexisp: A flexible camera image processing framework," *ACM Transactions on Graphics (TOG)*, vol. 33, no. 6, p. 231, 2014.

[45] K. He, X. Zhang, S. Ren, and J. Sun, "Deep Residual Learning for Image Recognition," *arXiv:* 1512.03385, 2015.

[46] S. Bosse, D. Maniry, K. Muller, T. Wiegand, and W. Samek, "Deep" neural networks for no-reference and full-reference image quality assessment," *IEEE Transactions on Image Processing*, vol. 27, no. 1, pp.

[47] 206-219, January 2018.

What is claimed is:

1. A method of processing an input image, comprising:
receiving the input image, and storing the image in a memory;
accessing, by an image processor, a computer readable medium storing a trained deep learning network having a plurality of convolutional layers, wherein each of at least a portion of said layers has a first plurality of feature extraction channels, and a second plurality of channels storing residual images with correction of color values relative to a previous layer;
by said image processor, feeding the input image to said trained deep learning network, summing, for each of said at least said portion of said layers, a respective residual image with a residual image of said previous layer, and feeing said summation to a next layer of said trained deep learning network; and
generating on a display device an output showing a residual image contained in a final layer of said trained deep learning network.

2. The method of claim 1, wherein said trained deep learning network is trained to execute at least two low-level image processing tasks.

3. The method of claim 2, wherein said at least two low-level image processing tasks are denoising and demosaicing.

4. The method of claim 1, wherein said input image is a raw image.

5. The method of claim 1, wherein said input image is a demosaiced image.

6. The method of claim 1, further comprising preprocessing said image by applying a bilinear interpolation, prior to said feeding.

7. The method of claim 1, wherein said trained deep learning network comprises at least 15 layers.

8. The method of claim 1, wherein a sum of said first and said second plurality of channels is at least 32.

9. A method of processing an input image, comprising:
receiving the input image, and storing the image in a memory;
accessing, by an image processor, a computer readable medium storing a trained deep learning network having a first part and a second part, wherein said first part has convolutional layers providing low-level features extracted from the input image, and convolutional layers providing a residual image but no low-level features, wherein said second part has convolutional layers for receiving said low-level features and extracting high-level features based on said low-level features;
by said image processor, feeding the input image to said trained deep learning network, and applying a transformation to said residual image based on said extracted high-level features; and
generating on a display device an output showing a residual image contained in a final layer of said trained deep learning network.

10. The method of claim 9, wherein each of at least a portion of said layers of said first part has a first plurality of feature extraction channels, and a second plurality of channels storing residual images with correction of color values relative to a previous layer.

11. The method of claim 10, further comprising summing, for each of said at least said portion of said layers of said first part, a respective residual image with a residual image of said previous layer, and feeing said summation to a next layer of said first part.

12. The method of claim 9, wherein said low-level features comprise denoising features and demosaicing features.

13. The method of claim 9, wherein said input image is a raw image.

14. The method of claim 9, wherein said input image is a demosaiced image.

15. The method of claim 9, further comprising preprocessing said image by applying a bilinear interpolation, prior to said feeding.

16. The method of claim 9, wherein said transformation comprises a non-linear function of color components of each pixel of said residual image.

17. The method of claim 9, wherein said applying said transformation is executed globally to all pixels of said residual image.

18. The method of claim 9, wherein said first part of said trained deep learning network comprises at least 15 layers.

19. An image capturing and processing system, comprising:
   an imaging device for capturing an image; and
   a hardware image processor for receiving said image and executing the method of claim 9.

20. The system of claim 18, being a component in a device selected from the group consisting of a smartphone, a tablet and a smartwatch.

\* \* \* \* \*